Nov. 23, 1943.   I. N. JORDAN   2,334,774
METHOD OF PACKING COMMINUTED MEATS
Filed April 3, 1941   2 Sheets-Sheet 1
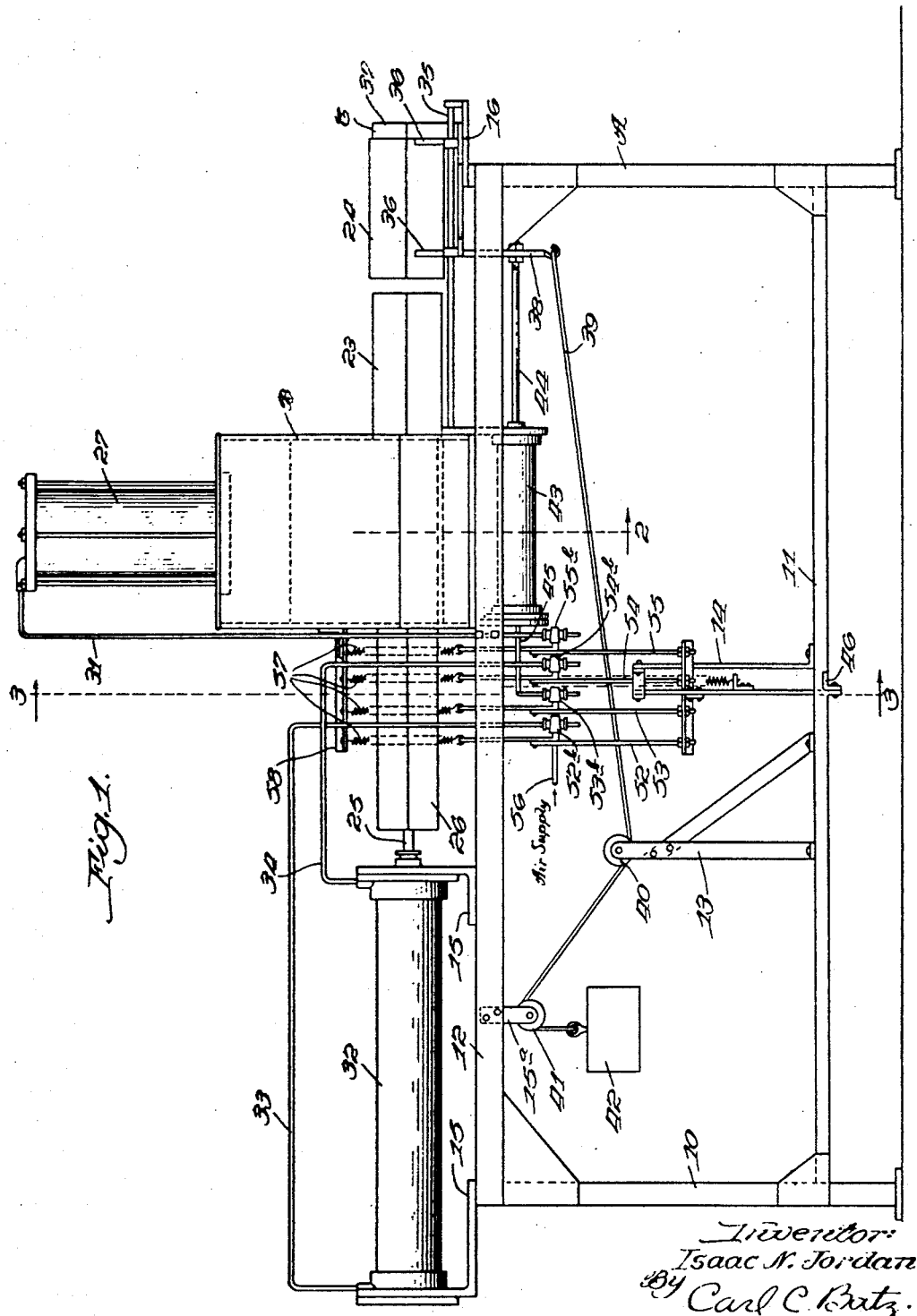
Inventor:
Isaac N. Jordan
By Carl C. Batz
Atty.

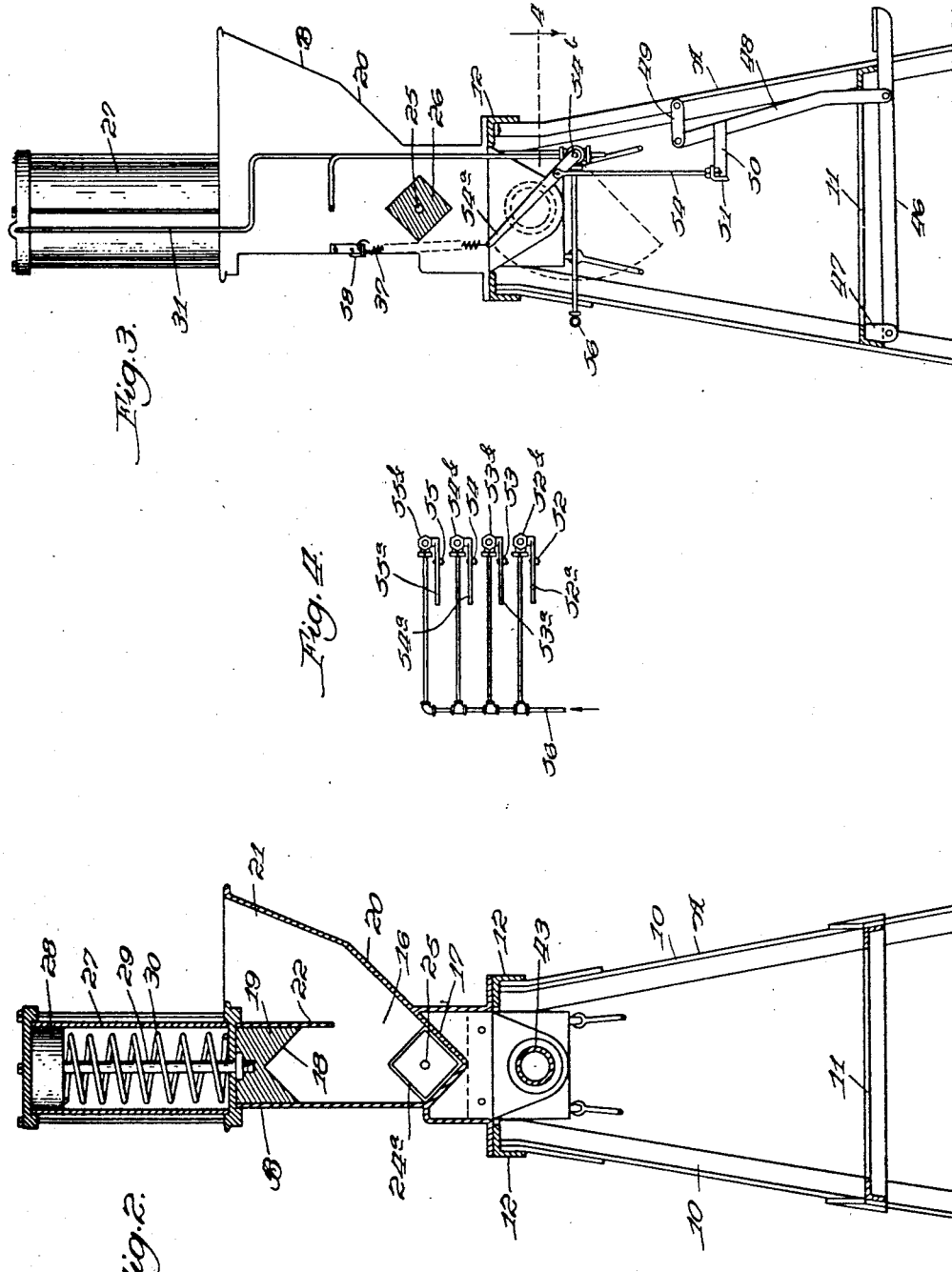

Patented Nov. 23, 1943

2,334,774

UNITED STATES PATENT OFFICE 2,334,774

METHOD OF PACKING COMMINUTED MEATS

Isaac N. Jordan, Chicago, Ill., assignor to Armour and Company, Chicago, Ill., a corporation of Illinois Application April 3, 1941, Serial No. 386,592

3 Claims. (Cl. 226—101)

This invention relates to a method of packing comminuted meats, such as chopped meats, ground meats, etc.

In the packing of comminuted meats in cans, a great deal of difficulty has been encountered due to the meat being compacted more in one portion of the can than in another and to the failure of said product to pack evenly when subjected to pressure under packing methods now employed.

An object of the present invention is to provide a method whereby the meat is distributed throughout the length of the can under a substantially uniform pressure so that an even distribution of the meat occurs throughout the filled container. Another object is to provide means whereby comminuted meat may be preshaped to fit a container of a predetermined shape and packed therein under steps which result in the uniform distribution of the shaped meat within the can. Other specific objects and advantages will appear as the specification proceeds.

The method may be practiced with apparatus which is set forth for the purpose of illustration. In the illustration given, Figure 1 is a side elevational view of apparatus suitable for use with my invention; Fig. 2, a transverse sectional view, the section being taken as indicated at line 2 of Fig. 1; Fig. 3, a transverse sectional view, the section being taken as indicated at line 3 of Fig. 1; and Fig. 4, a broken plan detail view of valve structure which may be employed with the apparatus.

The method comprises broadly the steps of forming the comminuted meat—a term which I use to include chopped meat, ground meat, etc.— into a shape substantially conforming to the interior of a container by means of compression and then without relieving the compression, moving the shaped material into one of the cans, the pressure exerted by the incoming meat within the can being resisted by pressure exerted against the bottom or exterior of the can. It will be understood that a great variety of apparatus suitable for carrying out the process might be employed. The apparatus illustrated is set forth merely by way of example and for indicating one means by which the method can be effectively practiced.

In the illustration given, A designates a frame; B, a stuffing hopper; and C, a can carriage device.

The frame structure A may be of any suitable form or type. In the illustration given, there are provided legs or pedestals 10 with a lower bed structure 11 and an upper bed or table structure 12. The bed structure 11 carries the pulley brace 13 and the valve road supporting structure 14. The upper bed or table carries a pulley strap 15ᵃ. The bed 12 also carries the air cylinder supporting brackets 15 and the carriage supporting bracket 16.

The hopper structure B rests directly upon the table or bed 12. It provides a stuffing chamber 16 of the shape illustrated more clearly in Figure 2. The bottom wall 17 of the chamber is generally V-shaped providing approximately one-half of a rectangular channel. The upper half of the rectangular channel is provided by the inverted V-shaped bottom or face 18 of the press 19. One wall 20 of the bottom of the chamber is extended laterally and the continuation thereof forms an open port 21 through which the meat or other products may be introduced. The casing provides end walls and side walls. The side wall 22, however, is interrupted so as to provide communication between the port 21 and the interior of chamber 16. The chamber 16 is provided with an outlet nozzle or guide 23 which extends rearwardly of the hopper and is adapted to snugly receive a rectangular can 24. When the press 19 is in lowered position, it forms a channel which is evenly aligned with the outlet guide 23. A plunger head 24ᵃ carried by compressed air operated rod 25 fits evenly within the channel provided by the bottom 17 of the chamber and the press head 19 and when forced forwardly causes the meat to be discharged through the channel and through the outlet guide 23. The plunger rod 25 is guided within a block 26 secured to the hopper casing.

For reciprocating the press 19, a cylinder 27 is supported upon the hopper casing B and is provided with a piston 28. A piston rod 29 is fixed to the piston 28 and to the press 19. A spring 30 normally urges the piston 28 toward its upper position. Compressed air is fed through line 31 into the top of the cylinder 27 to move the piston 28 downwardly.

For actuating the plunger rod 25, a compressed air cylinder 32 is illustrated, supported upon brackets 15 and provided with an air pipe 33 communicating with one end and another air pipe 34 communicating with the other end, thus enabling the piston within the cylinder to be moved in either direction.

The can carriage C may be of any suitable construction. In the illustration given, it comprises rod members 35 supporting can-carrying arms 36 and pressure end member 37. Secured to the carriage is a depending plate 38 to which is secured a cable 39. The cable extends under pulley 40 carried by the bracket 13 and over the pulley 41 suspended by bracket 15ª and is provided with a heavy weight 42 which urges the carriage C toward the can guide 23. A compressed air cylinder 43 is supported below the hopper B and is provided with a piston secured to a rod 44, the forward end of the rod being fixed to plate 39. Compressed air is introduced into the rear of the cylinder 43 through line 45.

For controlling the operation of the entire mechanism in the proper sequence, I have provided valve structure which is controlled by a single treadle. The treadle 46 is pivotally secured upon a bracket 47 and when depressed lowers a vertical link 48. The link at its top is pivotally connected to a short link 49 having one end pivotally connected to the frame A. Secured to the vertical link 48 is a rigid arm 50 supporting an angle iron plate 51. To plate 51 are secured four valve rods 52, 53, 54 and 55. The rod 52 is pivotally secured to a valve lever arm 52ª which rotates the core of a valve 52ᵇ. Similarly, the rod 53 is connected to the valve lever 53ª controlling valve 53ᵇ. Similarly, the valve rod 54 is connected to the valve lever 54ª controlling valve 54ᵇ. And likewise, the rod 55 is connected to the valve lever 55ª controlling the valve 55ᵇ. Compressed air enters the valve through the inlet 56. Leading from the valves are the compressed air lines 31, 33, 34 and 45. Each of the valves is also provided with a port through which the compressed air may be vented to the atmosphere from one side of the piston when it is desired to move the piston toward that side. Each of the valve lever arms 52ª, 53ª, 54ª and 55ª is provided with a spring 57, the upper end of which is secured to a bracket 58 carried by the hopper casing.

Operation

In the operation of the method in the device illustrated, an empty can 24 is placed upon the carriage C with the open end of the can facing the guide 23. Upon the first movement of the treadle downwardly, compressed air is released from the cylinder 45 through the valve port in valve 53 and under the influence of the weight 42 the carriage moves toward the hopper B and the can 24 is received upon the guide 23. A measured amount of the chopped corn beef or other meat or products has been introduced through the open port 21 and guided into the hopper bottom 17. The continued downward movement of the treadle 46 causes valve 55 to admit air through line 31 to the top of cylinder 27. Piston 28 then moves downwardly and the press head 19 descends, closing off communication with the open port 21 and forming a channel with the bottom of the hopper 17. This channel is the shape of the container or can 24 and the plunger head 24ª and it provides a continuous channel communicating evenly and without break with the guide 23 so that the meat after being reduced by means of the press 19 to a product of the desired shape may be pressed evenly into a container of the same shape. Continued downward movement of the treadle next causes valve 52 to admit compressed air through line 33 into cylinder 32 and the piston therein forces the plunger rod 25 toward the hopper 13 thus causing the plunger head 24ª to advance the meat within the channel in the bottom of the hopper through the guide 23 and into the container 24. The yielding pressure carriage C maintains a uniform pressure against the advancing meat body so as to insure the even filling of the container, as the container moves away from the hopper B, thus lifting the weight 42. When the pedal is released, valve 53ᵇ is opened to allow compressed air to flow into the cylinder 43 to force the plunger 44 forwardly to the position shown in Figure 1. By this movement, the carriage C is advanced to free the container 24 completely from the guide 23. In this position, the filled can 24 may be readily removed. In each of the foregoing operations which have been described, and where a power cylinder is employed, the valves release the air from the side of the cylinder toward which movement is to be made. For example, when the piston stroke in cylinder 32 is toward the hopper B, air is released through line 34 and valve 53 and vice versa; when the structure is in the opposite direction, air is released through line 33 and valve 52ᵇ. In the initial downward movement of the treadle, air is released through line 45 and valve 53ᵇ to permit the carriage to be drawn toward hopper B. This is followed by the operation of 54ᵇ in releasing air through line 34. On the upward movement of the pedal, valve 55ᵇ releases the air pressure from the top of cylinder 29 permitting the piston, under the force of the spring, to be returned to its upper position. Also, air is released through pipe 33 and valve 54ᵇ, while at the same time, air is admitted through valve 54ᵇ into line 34 to effect a retraction of plunger rod 25.

In the sequence of operations described, it will be noted that a measured quantity of meat is introduced into the hopper, the can is fitted upon the guide 23 under the influence of weight 42, air being released from cylinder 43 through line 49 and valve 53ᵇ. The pressure head 19 then descends to form the rectangular channel with the bottom of hopper 17. The plunger 25 then advances to press the meat within the channel forwardly through guide 23 and into container 24, the carriage C yielding while at the same time exerting pressure against the incoming product which is filling the container 24. The forward stroke of the cylinder rod 44 then releases the filled container 24 from engagement with the guide 23 so that it may be removed. Upon release of the treadle, the press 19 is raised and the plunger 25 is retracted, the various parts being now in position for the next cycle of operations for filling a new container.

In the new method, it will be noted that the comminuted meat is first shaped by lateral compression, causing the mass to assume the shape of the interior of the can or container into which it is to be packed and then by means of longitudinal pressure, the shaped mass while still maintained under the lateral compression is moved longitudinally into the container. The container is neither held loosely nor rigidly, but yields under a uniform pressure so that a uniform filling of the container, inch by inch, is insured.

In the specification and claims, I have used the word "comminuted" in its broad sense as including not only ground meat but also chopped meat and similar products.

While I have set forth specific steps in certain sequences and specific mechanism suitable for carrying out the invention, it will be understood that considerable variation may be made in all

I claim:

1. A method for packing a comminuted meat product and the like into a container, comprising compressing the product by lateral pressure into a shape conforming in cross section to the interior of the container, maintaining the shaped product under compression and against lateral movement, exerting pressure against one end of the shaped product to cause the same to move in a longitudinal direction through a discharge channel of substantially the same cross section as the shaped product and into a container slidably and telescopically received about the discharge channel with the closed end of the container at the end of the channel, exerting yielding pressure against the end of the container in a direction opposing movement of the product, continuing to exert pressure on the end of the product to cause the same to fill the container and simultaneously move the container in the direction of movement of the product against said yielding pressure, and when said container is substantially filled withdrawing the filled container from the discharge channel against said yielding pressure.

2. A method for packing a comminuted meat product and the like into a can of polygonal cross section, comprising compressing the product by lateral pressure into a polygonal shape conforming in cross section to the interior of the can, maintaining the shaped product under compression and against lateral movement, exerting pressure against one end of the shaped product to cause the same to move in a longitudinal direction through a discharge tube of substantially the same polygonal cross section as the shaped product and into said can slidably and telescopically received about the discharge tube with the closed end of the can at the end of the tube, the sides of the can being in alignment with the sides of the discharge tube, exerting yielding pressure against the end of the can opposing the longitudinal movement of the product, continuing to exert pressure on the end of the product to cause the same to fill the can and simultaneously move the can longitudinally in the direction of movement of the product against said yielding pressure, and when the can is substantially filled withdrawing the can from the discharge tube against the urging of said yielding pressure.

3. A method for packing a comminuted meat product and the like into a container, comprising compressing the product by lateral pressure into a body of a shape conforming in cross section to the interior of the container, thereafter while maintaining the product under compression and against lateral movement exerting pressure against one end of the body of the shaped product to cause the same to move in a longitudinal direction through a discharge tube of substantially the same cross section as the shaped product and into a container of the same cross section as the discharge tube, the container being of slightly greater cross section dimensions and slidably and telescopically received about the discharge tube with the closed end of the container at the end of the tube, exerting yielding pressure against the end of the container opposing the longitudinal movement of the product, continuing to exert pressure on the end of the product to cause the same to fill the container and simultaneously move the container longitudinally in the direction of movement of the product against said yielding pressure, and thereafter withdrawing the filled container from the discharge tube and against said yielding pressure.

ISAAC N. JORDAN.